May 28, 1963 E. ORLANDO 3,091,112
MEANS FOR SPLITTING THE EDGES OF SOFT WORKPIECES
Filed Dec. 8, 1959 2 Sheets-Sheet 1

INVENTOR.
EUGENIO ORLANDO
BY Richards & Geier
ATTORNEYS

May 28, 1963 E. ORLANDO 3,091,112
MEANS FOR SPLITTING THE EDGES OF SOFT WORKPIECES
Filed Dec. 8, 1959 2 Sheets-Sheet 2

INVENTOR.
EUGENIO ORLANDO
BY Richards & Geier
ATTORNEYS

United States Patent Office 3,091,112
Patented May 28, 1963

3,091,112
MEANS FOR SPLITTING THE EDGES OF SOFT WORKPIECES
Eugenio Orlando, Via Ennio 33, Milan, Italy
Filed Dec. 8, 1959, Ser. No. 858,249
Claims priority, application Italy Dec. 9, 1958
6 Claims. (Cl. 69—16)

The object of this invention is to provide a method and apparatus for sectioning the edges of soft workpieces of leather, artificial stuffs, and similar work-materials, particularly materials used for the manufacture of shoes and other articles in the leather industry.

By sectioning is meant the operation of splitting the work-piece along an edge in order to obtain a section having upper and lower strips by means of a measured cut into the material, the cut extending parallel to the lateral surface of the workpiece. It is also intended that the splitting operation be accomplished without regard to the edge configuration of the work-piece so that workpieces with both inner and outer curved edges can be sectioned with equal facility.

In the prior art only rigid workpieces of a certain thickness, for example, shoe soles, could be sectioned by means of stable or rotatable knives and then only for reduced deepness into the work-piece in respect with the thickness of the workpiece. In the case of thin or soft workstuffs this could not be done at all as the cutting and feeding forces would overcome the strength of these workstuffs with a resulting ripping off of the sectional strips from the workpiece.

While it is perhaps possible to give to a soft stuff an internal strength by a flat fixing of the soft stuff, it is not possible in the case where the material is to be sectioned, as the large friction forces attendant with the introduction of the knife into the stuff stretched out obviates the possibility of obtaining a neat cut.

All these difficulties are overcome by this invention.

According to the invention, there is temporarily imposed a sufficient rigidity to the workstuff by pressing it over a limited zone which hereafter is called the "pressing zone." The workstuff is brought into this pressing zone that is formed between a feeding element that rotates and a guiding body disposed above the feeding element.

This upper guiding body has a bowed form with a guiding edge that follows the sharp edge of a rotating knife disposed directly behind the guiding edge. Immediately after the workpiece has passed during its feeding along the guiding edge an expansion of the workpiece takes place.

The knife operates to cut into the workpiece, so that the workpiece has no possibility of sliding away during the sectioning operation. Thus the rigidity is not lost notwithstanding the expansion in because of the small distance between the pressing zone and the sharp edge of the knife. After the sectioning has taken place, the expansion of the workpiece is of no more consequence. It is only necessary that the stuff can no more come into contact with the sharp edge of the knife. This is insured by the provision of a protecting element that covers the sharp edge of the knife, and is disposed outside the operating zone of the rotatable knife. The protecting element serves at the same time as a further lower guiding means for the workpiece, and as a protecting device against injury or accident to the operator.

As a particularly good operating instrument there has been found a wholly flat cutting disc shaped as a plate, the flat side of it is turned against the feeding element, while the inclined face of the knife provided by sharpening the last lies upside down. Instead of a wholly flat knife, a conical shaped knife may be used, the sharp face of which forms a plane on the side turned towards the feeding element, while the external conical surface is turned towards the upper guiding body.

Of importance are both the position and the direction of rotation of the feeding element relative to that of the knife, and also the shape of the feeding element, the purpose of which is not only to create the pressure zone but also to provide the feeding movement. The feeding element has the shape of a cone, the summit of which is lying on the sharp edge of the knife or outside of it. The axis of rotation of the cone is inclined with respect to that of the cutting plane of the knife, so that a line upon the mantle of the cone extends within the operating zone of the sharp edge of the knife, more particularly within the limits of a zone between a secant between the starting and finishing point of the operating zone on the circumference of the rotating knife and the tangent drawn parallel to the secant on the circumference line of the knife, so that the said line upon the mantle is situated in a plane parallel to the cutting plane. This line on the cone mantle of the cone can be a straight line, and in this case the distances from the guiding edge to the surface of the cone are not absolutely equal, the differences, being, however, comprised within the order of the compressibility of the workstuff, and thus so small that they will have not an influence onto the formation of the pressing zone. When it is desired to have the distances absolutely equal, the generatrix of the conical rotating body has to be a curve corresponding to the position of said line upon the mantle in respect to the guiding edge. But such a cone is suitable only for a knife of a specific diameter.

Thus for every knife diameter a particular cone would be necessary due to the fact that with repeated sharpening the knife diameter would diminish, and the position of the cone with respect to the guiding vary. Therefore, a straight line upon the cone mantle is preferred due to its universal application.

The higher speed of feeding existing at the outer position of the cone that rotates for example in the clockwise sense (that is to say at the beginning of the operating zone where a work-piece is introduced into the pressing zone, in respect to the end of the operating zone in the neighborhood of the cone point), acts in such a way that the sectioning begins at the beginning of the operating zone. Due to the cooperation of the various amplitudes of feeding of the conical feeding element with the friction forces which are exerted on the workpiece by the cutting disc, which rotates in an opposite direction, there is obtained a direction of feeding that runs almost vertically to the connecting line of the cone top with the knife axis.

The upper guiding element, that extends from the border of the cone almost to its top, is disposed in a manner for the regulating of the thickness of the upper strip, and also for substitution of different size elements as necessary. The guiding edge extends in correspondence with the desired thickness of the upper strip to be formed in the workpiece, above and slightly outside the knife edge in such a way that a reduced space of expansion is left between the pressing zone and the knife edge. The end of the upper guiding element and the beginning of the lower guiding or protecting element overlap somewhat. The outer edge of the protecting element, that doesn't overlap with the upper guide, projects beyond the periphery of the knife, and eventually is bent upwards.

The border of the workpiece that has to be sectioned is introduced into the operating zone between the upper guiding element and the feeding element and a stop is provided on the point where the operating zone begins so that it cannot be introduced before that point.

The border of the workpiece, during its passage through the pressing zone, is divided into two parallel strips by the rotating knife, whereby the upper strip will move over the knife, and the lower strip will move underneath the knife, between the knife and the cone. The lower strip comes under the protecting element that lies directly on the lower side of the knife and prevents a further cutting of the workpiece.

As already mentioned above, the knives will have various diameters, either due to the sharpening, or due to the adopting of knives with different diameter, for example, for work-pieces with very small internal curves. In order that the guiding elements can be adapted to the diameter of the knife, and can be disposed furthermore in the most suitable position, they are interchangeable with pieces that are reciprocally determined in their largeness, and furthermore the position of the knife shaft, the axis of the feeding element, and the guiding elements can be reciprocally regulated; the axes of the rotating elements can be displaced parallelly to themselves. The feeding element is also resiliently mounted, with an upper limit position immediately beneath the knife plane, so as to be displaced downwards at each sectioning operation by a resilient pressure that produces the pressure for the pressing zone.

For regulating the deepness of the sectioning, a stop plate is provided that can be regulated in respect to a registering scale to control the desired depth of cut.

An embodiment of this invention is shown in the annexed drawings, and described in detail hereinunder.

Figure 1:
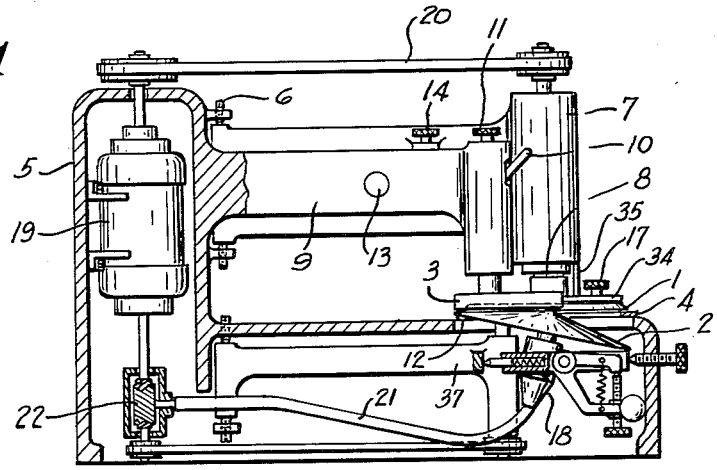
FIGURE 1 shows a side view of a machine for sectioning, partially represented in cross section.
Figure 2:
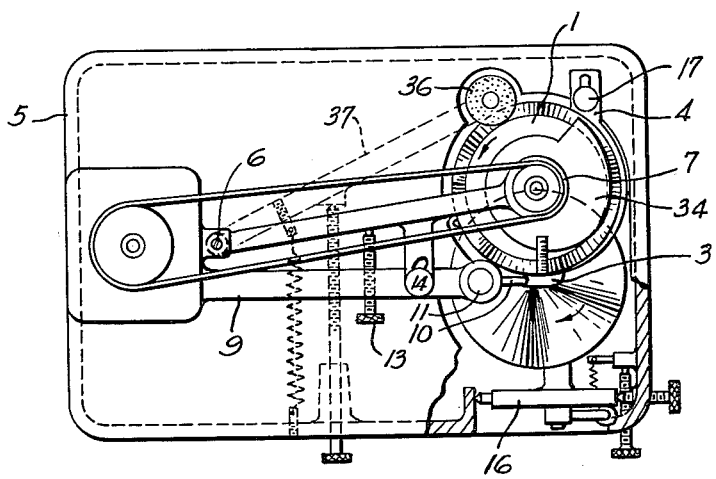
FIGURE 2 is a top view of the machine shown in FIGURE 1.
Figure 5:
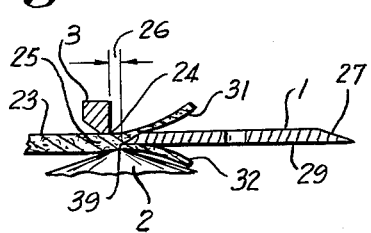
FIGURE 5 shows a cross section through the guiding element, a plate knife, and a workpiece.
Figure 6:
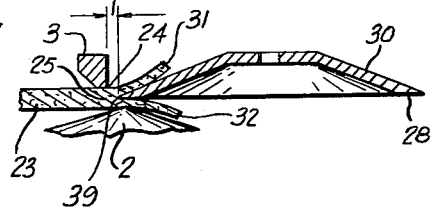
FIGURE 6 corresponds to FIGURE 5, but shows a cone shaped knife.
Figure 3:
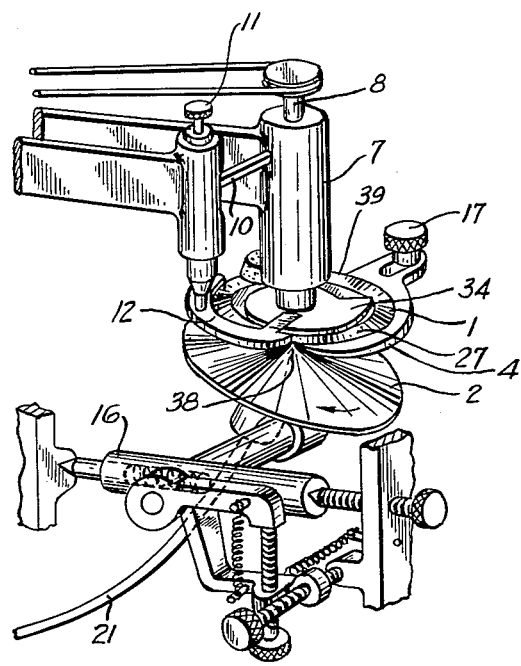
FIGURE 3 represents a part of the machine shown in perspective.
Figure 4:
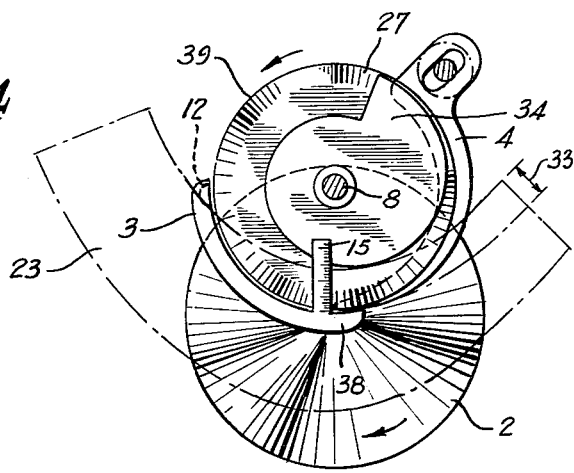
FIGURE 4 shows in a larger scale the most important elements of the machine: the knife with the thickness stop, the feeding cone, the upper guiding element with stop and scale, the lower guiding element, a workpiece.

On the machine frame 5 about a vertical axis 6 there is disposed an adjustable arm 7 with the supporting means for the knife axle 8. A disc knife 1 is fastened at the lower end of the knife axle 8, which rotates in counterclockwise direction. The machine is driven by an electric motor 19 through the belt drive 20.

The feeding element 2, which has cone-shape, rotates in clockwise direction, and its drive is through a flexible shaft 21 by a worm-wheel driving transmission 22, from the motor 19.

At the end of an arm 9, which is fixed on the machine frame, there are mounted usually known elements for regulating the level of the upper guiding element 3 provided with setting screw 11, and a lever 10 for its lowering. The operating zone extends from the stop 12 on the upper guiding element 3 to the cone top 38. At a point near one end of the upper guiding element 3 there is disposed a scale 15 that extends in a direction towards the knife axle 8; on this scale the deepness of the sectioning 33 is read for the corresponding positioning of a deepness limiting stop plate 34. This deepness stop 34 is made in form of a spiral curve, and is fixed by means of holder 35 on the arm 7, so that it can be rotated. A sharpening disc 36, driven through a usual transmission means by motor 19, is mounted on the sharpening arm 37, that can be adjusted in respect to the machine frame 5, about axis 6.

The arm 7 can be displaced by means of a set screw 13 supported by arm 9, and thus regulated, and fixed by the set screw 14.

The feed cone 2 is journalled on a holder 18 that in turn can be displaced by means of a slide guide 16; by means of further suitable elements of known kind the feed cone 2 is held with axial resiliency to an upper limit position.

The pressing zone 25 is formed between the upper guiding element 3 and the cone 2, and its maximum pressure is comprised beneath the guiding edge 24 provided at the upper guiding element 3.

Between the pressure zone 25, formed by the guiding edge 24 in the direction to the knife, and the sharp knife edge 39, there is the expansion space 26.

The lower guiding element 4 is disposed on the machine frame 5 by means of the set screw 17, said element 4 extending as a segment under the disc knife 1, with its one end also extending to the cone top 38, and underlying the near end of the upper guiding element 3. A workpiece 23 is introduced at the beginning of the operating zone along the stop 12 between the upper guiding element 3 and the feeding cone 2 into the pressure zone 25. On leaving this pressure zone, the workpiece is sectioned by the sharp edge 30 into the upper strip 31 and the lower strip 32.

When a flat disc knife 1 is used, its flat side 29 is turned against the feeding element 2, while the sharpened bevel of the edge 27 is turned towards the upper guiding element 3. When a conical knife 30 is employed, its flat face 28 is turned towards the feeding element 2, and its conical surface is turned towards the upper guiding element 3.

What I claim is:

1. An apparatus for sectioning edges of soft pieces of leather, plastics and the like, said apparatus comprising a rotary disc knife, means connected with said disc knife for rotating it in one direction, an upper guiding element having a curved edge, means connected with said upper guiding element for supporting it in a position wherein said curved edge is parallel to and spaced upwardly and sidewise from a portion of the cutting edge of said rotary disc knife, a feed cone, means rotating said feed cone in a direction opposite to the direction of the knife, and means for adjustably supporting said feed cone below said disc knife in an inclined position wherein a curved portion of said feed cone is located below the space between said edges of the rotary disc knife and the upper guiding element, whereby the edge of a soft piece to be sectioned is subjected to pressure in a zone between said upper guiding element and said feed cone and to expansion in a space adjacent to the pressure zone and to the cutting edge of the rotary disc knife.

2. An apparatus in accordance with claim 1, comprising a stop carried by said upper guiding element adjacent one end thereof, the other end of said guiding element being located above and close to the top of said feed cone.

3. An apparatus in accordance with claim 1, comprising a stop plate located above said rotary disc knife, and a scale carried by said upper guiding element and extending over said stop plate.

4. An apparatus in accordance with claim 1, comprising a frame, an arm carrying said rotary disc knife, and means swingably connecting said arm to said frame for a swinging movement about a vertical axis.

5. An apparatus in accordance with claim 4 wherein the third-mentioned means comprise a slide guide for shifting said feed cone in a direction transverse to the swinging movement of said arm.

6. An apparatus in accordance with claim 4 comprising a stop plate carried by said arm and located above said rotary disc knife, and a scale carried by said upper guiding element and extending over said stop plate.

References Cited in the file of this patent

UNITED STATES PATENTS

| | | |
|---|---|---|
| 1,091,753 | Muther et al. | Mar. 31, 1914 |
| 2,089,246 | Batchelder | Aug. 10, 1937 |